UNITED STATES PATENT OFFICE.

REESE P. COUGHLIN, OF CINCINNATI, OHIO.

IMPROVEMENT IN COMPOUNDS FOR ARTIFICIAL MARBLE.

Specification forming part of Letters Patent No. 196,971, dated November 31, 1877; application filed March 13, 1877.

*To all whom it may concern:*

Be it known that I, REESE P. COUGHLIN, of the city of Cincinnati, county of Hamilton, State of Ohio, have invented certain Improvements in Artificial Marble, of which the following is a specification:

My invention consists in an artificial marble composed of Glauber's salts, sulphate of manganese, water, and hydraulic or marble cement.

In preparing my compound I mix the ingredients in the following proportions: Glauber's salts, two (2) ounces; sulphate of manganese, one (1) ounce, dissolved in water; water, twenty (20) gallons, and a sufficient quantity of cement to make it of the proper consistency.

By the use of a hydraulic screw or lever pressure I am enabled to solidify the marble by forcing the air and surplus moisture from the cement, thus saving the labor of filling, much time in drying, and greatly improving the quality of the article produced.

After the article has hardened sufficiently to be handled, I prepare the face by honing, and finish with a stone-polish, although any stone-finish may be used.

Having described my invention, what I claim as new, and desire to secure by Letters Patent, is—

An artificial marble consisting of hydraulic cement, in combination with a solution of Glauber's salts, sulphate of manganese, and water, substantially as specified.

REESE P. COUGHLIN. [L. S.]

Witnesses:
JOHN W. REILEY,
JAY W. COWDREY.